INVENTOR.
JEFFERSON T. MITCHELL
BY
ATTY.

United States Patent Office 3,312,877
Patented Apr. 4, 1967

3,312,877
CURRENT RESPONSIVE SIGNALING CIRCUITRY
Jefferson T. Mitchell, Bay Village, Ohio, assignor to Lorain Products Corporation, a corporation of Ohio
Filed May 8, 1964, Ser. No. 366,032
1 Claim. (Cl. 317—148.5)

This invention relates to signaling circuits and is directed more particularly to signaling circuitry utilizing semiconductors.

It is frequently desirable that in the event of failure of a power unit which is supplying current to a load, an auxiliary power unit be energized to supply the current. An example of this is in the telephone industry where a charger and a plurality of loads may be connected across a battery. Since the current for the loads is normally drawn from the charger, the battery is maintained in fully charged condition. However, failure of the charger will allow the battery to become discharged. Thus it is necessary to provide a reserve or standby charger which will supply current for the battery and loads if the primary charger fails. This may be accomplished by signaling circuitry which includes the auxiliary charger when current is being supplied to the battery and loads by the primary charger.

Accordingly, it is an object of the invention to provide signaling circuitry which controls an ancillary circuit in response to changes in current being supplied to the load from a source of power.

It is another object of the invention to provide signaling circuitry which is sensitive yet relatively inexpensive and compact.

It is a further object of the invention to provide semiconductor signaling circuitry which energizes a relay when the load current of a power supply device exceeds a predetermined magnitude.

Additionally, it is an object of the invention to provide circuitry in which a bistable element, having a low voltage state and a high voltage state, is controlled by a current proportional to load current and supplied from a constant current source, the bistable element controlling a transistor which operates a relay.

Still another object of the invention is to provide circuitry of the above character in which the bistable element may have low current handling capacity relative to the current supplied from the constant current source but which will not be damaged by such current.

Other objects and advantages of this invention will become apparent from the following description and accompanying drawings in which.

Figure 1:
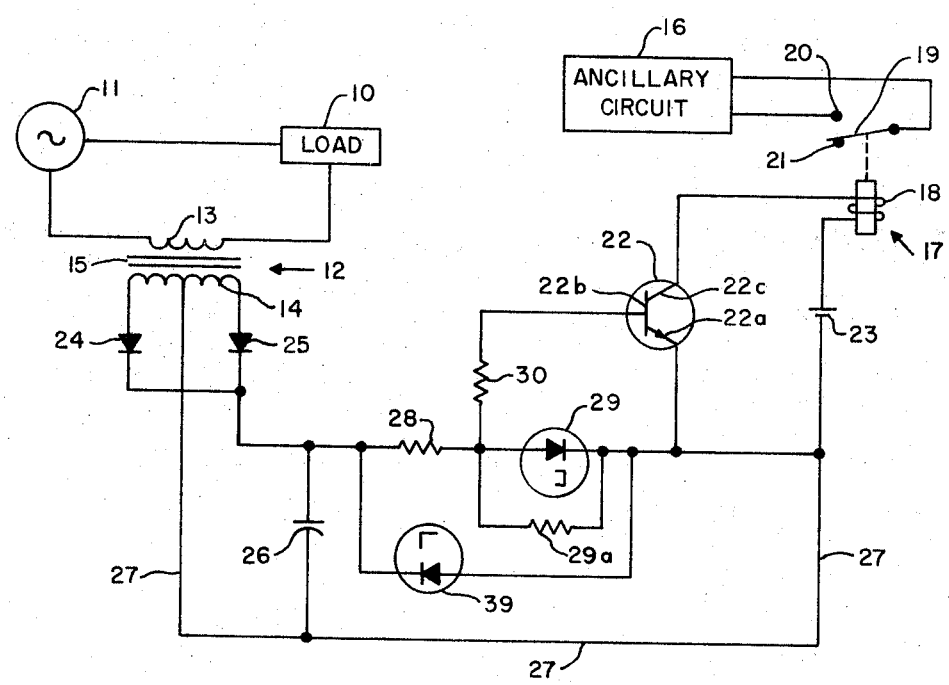
FIGURE 1 is a schematic drawing of the circuitry embodying the invention.

Referring to FIGURE 1, it will be seen that circuitry embodying the invention may include a load 10 energized from a suitable source of A.-C. power 11 and a transformer 12 having a primary winding 13 and a center-tapped secondary winding 14, both carried on a core 15. The primary winding 13 of a transformer 12 is connected serially in the path of the current flowing between load 10 and the A.-C. source 11. With this manner of connection of the primary winding 13, the secondary winding 14 serves as a constant current source in that the current flowing therein is substantially unaffected by changes in the conduction of circuits connected across the secondary winding 14.

In order that ancillary circuit 16 may be open circuited when the current flowing between the load 10 and the A.-C. source 11 becomes greater than a predetermined value, there is provided a relay 17 having a winding 18, an armature 19 and contacts 20 and 21. The relay 17 is controlled by an N-P-N type transistor 22 having an emitter-electrode 22a connected to the lower end of relay winding 18 through a D.-C. source 23, a collector electrode 22c connected to the upper end of the relay winding 18 and a base electrode 22b, the connections of which will be described presently. It will be seen that when a forward bias voltage is applied between the base electrode 22b and the emitter electrode 22a, transistor 22 will conduct, causing current to flow through the relay winding 18. This energization of the relay 17 causes the armature 19 to be pulled away from the contact 20 against which it is normally positioned and to come to rest against the contact 21. Thus when the relay 17 is energized, the ancillary circuit is open circuited.

The alternating current flowing in the primary winding 13 of the transformer 12 may be converted to direct current suitable for use with the circuitry described herein by means of rectifiers 24 and 25 connected between the outer ends of the secondary winding 14 and the upper end of a filter capacitor 26. The rectifying and filtering circuit is completed by connecting the center tap of the secondary winding 14 to the lower end of the filter capacitor 26 through a lead 27 which is also extended beyond the latter connection to provide a current return path for the circuits to be described presently.

To the end that the transistor 22 will be rendered conducting to energize the relay 17 when the load current becomes greater than a predetermined value, there is provided a resistor 28 and a tunnel diode 29 serially connected between the upper end of the filter capacitor 26 and the lead 27. The base electrode 22b of transistor 22 is connected to a point between the resistor 28 and the tunnel diode 29 through a resistor 30 to effect control of the transistor 22 by the tunnel diode 29. From the foregoing described connection of the resistor 28 and the tunnel diode 29, it will be seen that a current which is proportional to the load current flowing between the load 10 and the A.-C. source 11 is directed through the resistor 28 and the tunnel diode 29 from the rectifiers 24 and 25. Thus the tunnel diode 29 functions as a current driven element.

Figure 2:
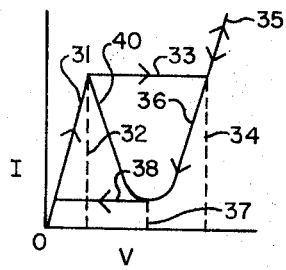
FIGURE 2 depicts the operating characteristic of a current driven tunnel diode.

The characteristic curve of a tunnel diode is shown by lines 31, 40, 36 and 35 in FIGURE 2. However, the operating point of a current driven tunnel diode does not follow the curves 40 and 36 but proceeds along a path which will now be described. As current through the tunnel diode 29 increases from zero, the voltage across the tunnel diode also increases, this relationship being shown at 31. Any further increase of the tunnel diode current after the voltage across the tunnel diode 29 has attained the value indicated by the dashed line 32 causes the operating point to follow the path shown at 33 to a voltage indicated by the dashed line 34. Thus it will be seen that as the tunnel diode current increases, the tunnel diode switches from a low voltage state to a high voltage state in response to a very small increase in current. After the tunnel diode switches to the high voltage state, further increase in current moves the operating point along the path 35. As the tunnel diode current decreases when the current delivered to the load 10 decreases, the operating point of the tunnel diode 29 moves downwardly along the successive paths indicated at 35 and 36. After the voltage across the tunnel diode has declined to a holding value shown by the dashed line 37, any further decrease in current will cause the operating point of the tunnel diode to move along the path 38 and consequently the voltage across the tunnel diode will drop sharply. When the voltage across the tunnel diode 29 is of a value in the range indicated by the dashed lines 34 and 37, the tunnel diode may be considered to be in a high voltage state. A value of voltage less than that indicated by dashed line 32 places the tunnel diode 27 in a low voltage state. Hence, from the operating characteristic shown in FIGURE 2, the tunnel diode 29, because it may be in either a high or low voltage state, serves as a current driven bistable voltage element in the circuitry embodying the invention.

From the foregoing, it will be seen that the tunnel diode switches from a low voltage state to a high voltage state when the current therethrough becomes greater than the value indicated by line 33. This high voltage state is maintained until the tunnel diode current drops below the value shown at 38. Thus, the sensitivity of tunnel diode may be considered to be the difference in value of current shown by line 33 and that indicated by line 38.

Figure 3:
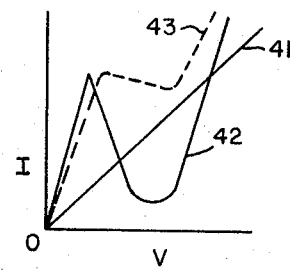
FIGURE 3 shows the characteristic curves of a tunnel diode and a resistor and a composite curve and, FIGURE 4 illustrates the operating characteristic of the tunnel diode arrangement utilized in the circuitry embodying the invention.

To the end that the sensitivity of the tunnel diode and, consequently, the overall sensitivity of the signaling circuit may be increased, a resistor 29a is connected in parallel with the tunnel diode 29. The characteristic curve of the resistor 29a and the tunnel diode 29 are shown at 41 and 42, respectively, in FIGURE 3. By paralleling the tunnel diode 29 and the resistor 29a, a composite curve indicated by dashed line 43 results.

Figure 4:
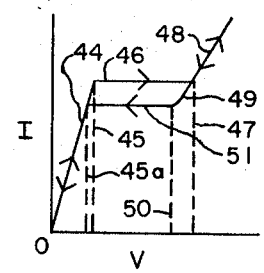

With the above arrangement, the operating characteristic of tunnel diode 29 when current driven is illustrated in FIGURE 4. The current and voltage of the tunnel diode 29 increase along 44 until the voltage attains the value shown by dashed line 45. Any further increase of tunnel diode current causes the operating point to move rapidly along the line 46 to a voltage indicated by the dashed line 47. The tunnel diode thus switches from a low voltage state to a high voltage state. The operating point then moves upwardly along line 48 if the tunnel diode current continues to rise.

As the tunnel diode current decreases the operating point moves downwardly along lines 48 and 49 and the tunnel diode voltage decreases correspondingly to a holding value indicated by dashed line 50. As the current through the tunnel diode 29 decreases further, the operating point moves rapidly along the path shown at 51 to the voltage value of line 45a and thereby switches from a high voltage state to a low voltage state. The operating point will follow line 44 as the tunnel diode current decreases to zero.

From the operating characteristic of FIGURE 4, it will be seen that the tunnel diode 29 switches to a high voltage state when the current therethrough becomes greater than the value indicated by line 46 and switches to a low voltage state when the current therethrough becomes less than the value shown by line 51. The difference in magnitude of these currents is much less than the difference between the respective currents which cause the tunnel diode 29 to switch to a high voltage state and back to a low voltage state as described previously. Thus it will be seen that by connecting a resistor 29a in parallel with the tunnel diode 29 to produce the operating characteristic shown in FIGURE 4, the sensitivity of the tunnel diode 29 is greatly increased.

The operation of circuitry embodying the invention will now be described. As current supplied to load 10 from the A.-C. source 11 increases from zero, the current through tunnel diode 29 and resistor 29a increases until the voltage across the tunnel diode 29 and resistor 29a attains the value shown at 32 in FIGURE 2. This voltage is insufficient to forward bias transistor 22. However, any further increase in load current and, consequently, of the tunnel diode 29 current causes the tunnel diode to switch from a low voltage state to a high voltage state. This high voltage state of the tunnel diode 29 renders the transistor 22 conducting whereby the relay 17 is energized to open circuit the ancillary circuit 16. As the current through the tunnel diode 29 and resistor 29a decreases in response to a decrease of load current, a point will be reached, as described previously, at which a tunnel diode 29 will switch from a high voltage state to a low voltage state. This action causes transistor 22 to turn off thereby de-energizing relay 18 and closing the ancillary circuit 16. It will be understood that a P-N-P type transistor may be used in place of the N-P-N type transistor 22 by reversing the base 22b and emitter 22a connections across the tunnel diode 29 and by reversing the polarity of the D.-C. source 23.

Because the tunnel diode 29 may be damaged or destroyed by excess currents directed through it by the rectifiers 24 and 25, it is desirable to provide protection for the tunnel diode. In this case, the protection is in the form of an off-on conducting device which may be a breakdown or zener diode 39 connected between the upper end of the filter capacitor 26 and the emitter electrode 22a. When the voltage across the combination of resistor 28 and the tunnel diode 29 becomes sufficient to cause the zener diode 39 to breakdown and conduct, any further increase in current supplied from the rectifiers 24 and 25 will be shunted around the resistor 28 and the tunnel diode 29. Therefore, the tunnel diode 29 will not be subjected to current greater than a prescribed safe magnitude though the current output of the rectifiers 24 and 25 is much greater than this safe value.

From the foregoing description it will be seen that there is provided semiconductor circuitry which is inexpensive and compact. Additionally, this signaling circuitry is sensitive in that a very slight decrease in load current below a predetermined value causes a relay to be de-energized to thereby close an ancillary circuit. Of course, if desired, the contacts of the relay may alternatively be connected so that an ancillary circuit will be opened rather than closed when the relay is de-energized.

It will be understood that the embodiments shown herein are for explanatory purposes and may be changed or modified without departing from the spirit and scope of the invention as set forth in the claim appended hereto.

What I claim is:

In a signaling circuit responsive to the current supplied to a load from an A.-C. source, in combination, a transformer having a primary winding connected serially in the load current path and a secondary winding connected to capacitive means through rectifying means, first resistive means and tunnel diode means serially connected across said capacitive means whereby current proportional to load current is directed through said first resistive means and said tunnel diode means, a zener diode connected across said capacitive means to shunt current greater than a prescribed value around said first resistive means and said tunnel diode means, a transistor having emitter, collector and base electrodes, a D.-C. source, a relay having a winding, means for connecting said D.-C. source and said winding of said relay serially between said collector and emitter electrodes of said transistor, second resistive means connected between said base electrode of said transistor and one end of said tunnel diode means, means for connecting the emitter electrode of said transistor to the other end of said tunnel diode means and third resistor means connected in parallel relationship with tunnel diode means.

References Cited by the Examiner

UNITED STATES PATENTS 3,153,151 10/1964 Farnsworth _____ 307—88.5
3,214,608 10/1965 Mollinga _____ 307—88.5
3,214,641 10/1965 Sonnemann _____ 317—36

FOREIGN PATENTS 1,318,313 1/1963 France.

OTHER REFERENCES

Silicon Zener Diode and Rectifier, Hardbook, Motorola, 1961, TK 7872 S4M66, pp. 75–78.

MILTON O. HIRSHFIELD, *Primary Examiner.*

J. A. SILVERMAN, *Assistant Examiner.*